United States Patent [19]

Voorman et al.

[11] 4,090,138
[45] May 16, 1978

[54] FSK TRANSMITTER HAVING FREQUENCY BAND-LIMITATION

[75] Inventors: Johannes O. Voorman; Johan M. Schmidt, both of Eindhoven, Netherlands

[73] Assignee: U.S. Philips Corporation, New York, N.Y.

[21] Appl. No.: 698,407

[22] Filed: Jun. 21, 1976

[30] Foreign Application Priority Data

Jul. 2, 1975 Netherlands .......................... 7507858

[51] Int. Cl.² .............................................. H04B 1/04
[52] U.S. Cl. ....................................... 325/163; 325/30; 178/66 A
[58] Field of Search ................... 325/163, 30, 145; 178/66 R, 66 A

[56] References Cited

U.S. PATENT DOCUMENTS

| | | | |
|---|---|---|---|
| 3,486,117 | 12/1969 | Groves | 325/163 |
| 3,506,784 | 4/1970 | Garland | 325/163 |
| 3,626,417 | 12/1971 | Gilbert | 178/66 R |
| 3,921,102 | 11/1975 | Voorman et al. | 332/9 R |

Primary Examiner—Benedict V. Safourek
Assistant Examiner—Michael A. Masinick
Attorney, Agent, or Firm—Frank R. Trifari; Henry I. Steckler

[57] ABSTRACT

A signal consisting of square pulses is applied to an FSK transmitter and is transformed into a control signal consisting of substantially symmetrical trapezoidal pulses. This control signal is applied on the one hand to a gyrator oscillator modulator to generate an FSK signal and on the other hand to a conversion device which converts the control signal into a direct voltage signal the direct voltage value of which shows a positive pulsatory variation each time during the occurrence of the edges of the trapezoidal pulses of the control signal. Said direct voltage signal is used to subsequently modulate the FSK signal in an amplitude modulator. The amplitude-modulator FSK signal may now be applied directly as a modulation signal to a carrier modulator without the intermediary of a band-pass filter.

6 Claims, 6 Drawing Figures

FSK TRANSMITTER HAVING FREQUENCY BAND-LIMITATION

The invention relates to an FSK transmitter having frequency band-limitation. Such transmitters are well-known and the requirements as regards the frequency band-limitation which such transmitters should meet are fixed by the CCITT. For example, the $3^{rd}$, $4^{th}$ and higher order sideband amplitude levels should be attenuated respectively to at least −37 dB, −43 dB and more with respect to the carrier amplitude level.

In order to be able to meet the above-mentioned requirements, known FSK transmitters are equipped with an output filter in the form of a LC band-pass filter comprising at least three to four coils.

It is the object of the invention to provide an FSK transmitter which avoids the use of the comparatively expensive and bulky band-pass filter and which nevertheless satisfies the above-mentioned requirements as regards the frequency band-limitation.

The FSK transmitter according to the invention is characterized in that the required frequency band-limitation is realized by the use in combination of:

a. a first device to which an information signal consisting of square pulses is applied to generate a control signal consisting substantially of symmetrical trapezoidal pulses having a recurrence time equal to that of the said square pulses;

b. a second device to which the control signal supplied by the said first device is applied to generate a direct voltage signal the direct voltage value of which shows a positive pulsatory variation each time during the occurrence of the edges of the substantially symmetrical trapezoidal pulses of the control signal;

c. an oscillator modulator formed by a substantially instantaneously linearly controllable gyrator having a frequency control input to which the control signal supplied by the said first device is applied as a frequency modulation signal to generate an FSK output signal;

d. an amplitude modulator having a first input to which the FSK output signal of the said gyrator is applied and having a second input to which the direct voltage signal of the said second device showing positive pulsatory variations is applied as a modulation signal, and having an output from which the band-limited FSK signal is derived.

When the combination of measures according to the invention is used it is not only the use of a band-pass filter that is avoided but a construction integrated in a semiconductor body is also possible for realizing such an FSK transmitter.

The invention and its advantages will now be described by way of example with reference to the diagrammatic drawings, in which.

Before describing a transmitter embodying the invention, the requirements as regards the frequency band limitation to be imposed upon such a transmitter according to the CCITT recommendations should be stated. For example, one requirement is the damping variation shown in FIG. 1 by the curves A and A', in which the amplitude level of the first order sideband may show only a maximum attenuation of approximately 6 dB with respect to the amplitude level of the carrier, the attenuation of the second order sideband level should be at least between 12 and 18 dB, and the amplitude levels of the third and fourth order sidebands should be at least 36 dB and 42 dB, respectively, below the carrier amplitude level.

Figures 2, 6:
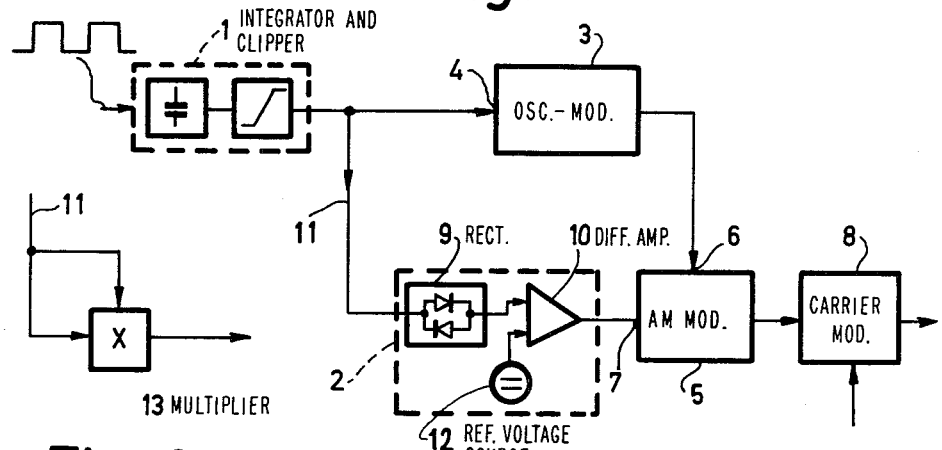
FIG. 2 shows a possible embodiment of the FSK transmitter according to the invention.
FIG. 6 shows an alternative embodiment of a device used in the transmitter shown in FIG. 2.

An FSK transmitter which satisfies the above-mentioned requirements without the conventional use of a narrow band output filter is obtained in accordance with the invention if said transmitter, as is shown in FIG. 2, comprises in combination:

a. a first device 1 to which an information signal consisting of square pulses is applied to generate a control signal consisting of substantially symmetrical trapezoidal pulses having a recurrence time equal to that of the said square pulses;

b. a second device 2 to which the control signal supplied by the said first device 1 is applied to generate a positive direct voltage signal, the direct voltage value of which shows a positive pulsatory variation each time during the occurrence of the edges of the substantially symmetrical trapezoidal pulses of the control signal, c. an oscillator modulator which is formed by a substantially instantaneously linearly controllable gyrator having a frequency control input 4 to which the control signal supplied by the said first device 1 is applied as a frequency modulation signal to generate an FSK output signal, and d. an amplitude modulator 5 having a first input 6 to which the FSK output signal of the said linearly controllable oscillator modulator 3 is applied and having a second input 7 to which the direct voltage signal of the said second device 2 showing the positive pulsatory variations is applied as a modulation signal and having an output 8 from which the band limited FSK signal is derived.

Figure 3:
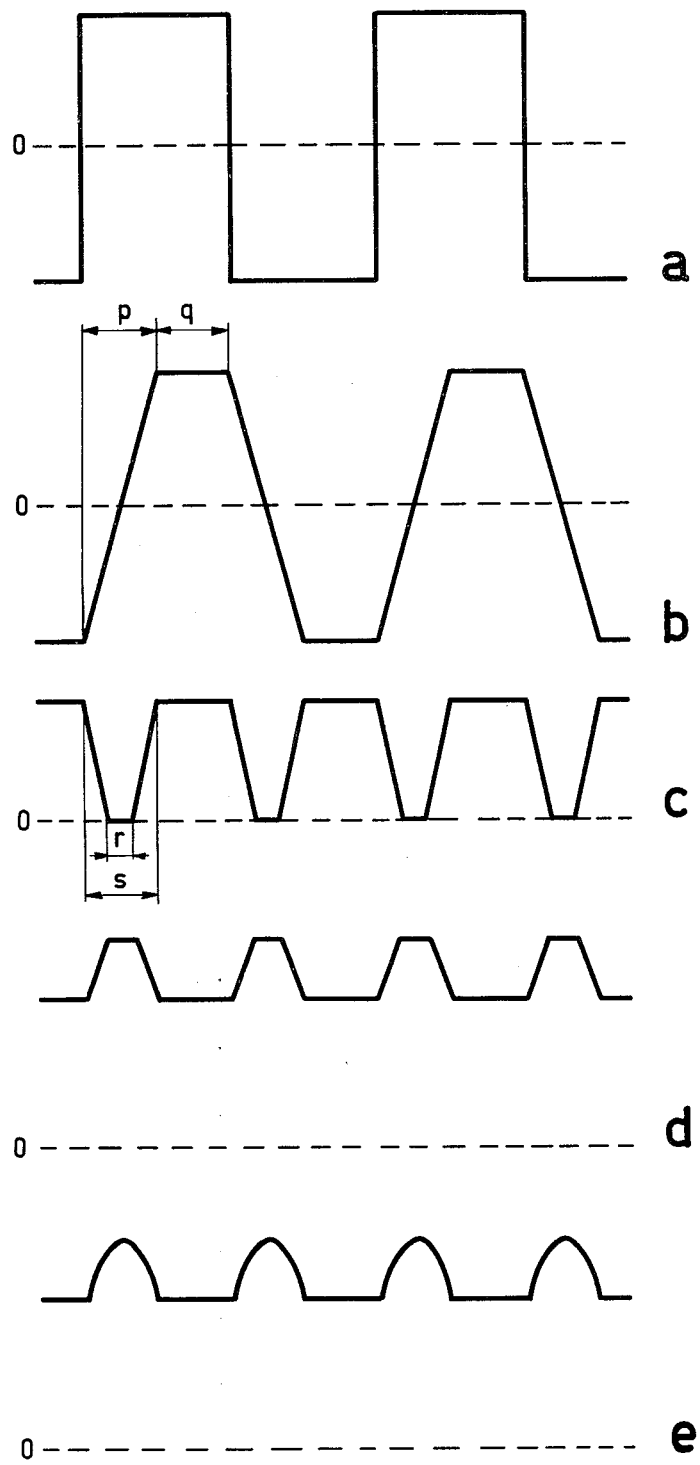
FIGS. 3a–e show a number of signal forms to explain the transmitter shown in FIG. 2.

The said first device 1 is preferably formed by an integrating network succeeded by a two-sided limiter. The information signal supplied to the input of which device consisting of square pulses for example a telegraph signal, as shown in FIG. 3a; the signal appearing at the output of the device 1 after integration and two-sided limitation of the input information signal is in the form of symmetrical trapezoidal pulses having a recurrence time equal to the said square pulses, as is shown in FIG. 3b. This output signal is applied as a control signal to the control input 4 of an oscillator modulator 3, which consists of a gyrator, the input gate and the output gate of which are each terminated by a capacitor to form a resonant circuit, the gyrator also comprises a feedback circuit by means of which the Q-factor of the resonant circuit can be increased to such an extent that the gyrator resonant circuit will function as an oscillator, while the gyration transconductance $G(t)$ which is decisive of the oscillation frequency can be varied by means of controllable resistors or controllable voltage-controlled current sources. A gyrator oscillatormodulator of the above-mentioned type is described in greater detail, for example, in the U.S. Pat. No. 3,921,102.

The particular properties of a gyrator as an FM/FSK modulator are described inter alia in an article entitled "Ideal Frequency Modulator" in Electronic Letters of Sept. 5, 1974, Volume 10, No. 18. For example, such a modulator has the advantage that theoretically no energy is stored or lost in the gyrator itself, since the energy, when the circuit oscillates, flows from one capacitor to the other capacitor and then back again. The gyration transconductance controls only the rate at which said energy exchange takes place, that is to say the oscillation frequency. The wave form is harmonically pure, i.e. the wave form spectrum does not comprise any frequency components which are not pure harmonics of the fundamental frequency. A variation of the gyration transconductance results in a substantially instantaneous linear frequency variation without transition phenomena, since the energy in the circuit does not vary. Since consequently no phase leaps occur and the voltage amplitude of the oscillations remains constant, such a gyrator oscillator modulator is an ideal frequency modulator and is particularly suitable for use as an FSK modulator.

Figure 4:
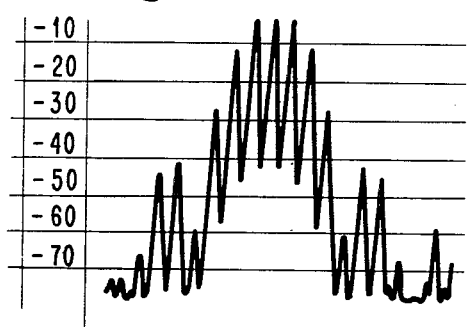
FIG. 4 shows a line spectrum of the FSK signal.

For illustration FIG. 4 shows the line spectrum of the FSK signal of 100 Band, 2300 Hz appearing at the output of the gyrator oscillator modulator 3 and measured by means of a spectrum analyser (Hewlett-Packard Type 141T,8556A); this result was obtained with a periodic modulation signal (FIG. 3b) derived from the first device 1 and consisting of symmetrical trapezoidal pulses, the ratio between the times of slope and the flat part of each of the trapezoidal pulses being approximately 1/1 (see FIG. 3b, $p/q \approx 1/1$). This line spectrum clearly shows that the fourth sideband component was considerably attenuated to a level of about ($-60$ dB), whereas the third sideband component was attenuated to a much lesser degree.

In order further to suppress the undesired sideband components and in particular the third sideband component, the transmitter shown in FIG. 2 comprises an amplitude modulator 5 in which the output signal of the gyrator oscillator modulator 3, applied at terminal 6, is amplitude-modulated by the output signal, applied at terminal 7, of the said second device 2. In the embodiment of the device 2 comprises a full-wave rectifier 9 followed by a differential amplifier 10. The control signal of FIG. 3b which appears at the output of the first device 1 and consists of trapezoidal pulses is applied along the line 11 to the rectifier 9.

Figure 5:
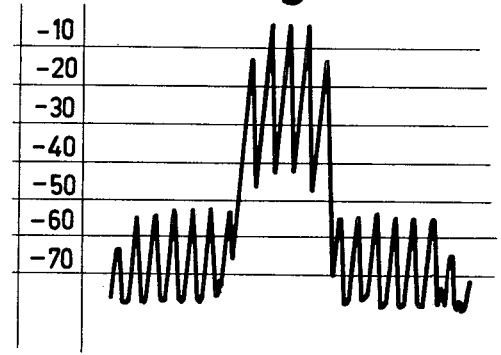
FIG. 5 shows a line spectrum of the amplitude-modulated FSK signal.

Full-wave rectification of a trapezoidal signal results in a signal in which the excursions from peak value to zero and back to peak are triangular. The peaks of this triangular signal are cut off by any suitable means not shown, preferably in such a manner that the ratio between basewidth $r$, and peak width $s$ is approximately equal to 1 to 4 ($r/s \approx 1/4$, see FIG. 3c). This signal is then applied to a first input of the differential amplifier 10. A direct voltage derived from a reference source 12 is applied to the other input of the differential amplifier so that at the output of the differential amplifier appears a positive direct voltage signal, as shown in FIG. 3d, with a superimposed positive pulsatory variation during each occurrence of the sloping portion of the symmetrical trapezoidal pulses of the control signal, supplied by the first device 1, as shown in FIG. 3b. This output signal of the second device 2 is applied to the modulation signal input 7 of the amplitude modulator 5 and ensures the amplitude-modulation of the FSK signal applied to said amplitude modulator from oscillator modulator 3. An accurate adjustment of the AM modulation depth to suppress the third sideband component to some 55 dB below the carrier signal level, then results in an overall sideband suppression as is shown in the line spectrum of FIG. 5. It will be obvious that this degree of suppression of the undesired sidebands can be realized only with a very accurate adjustment of the slope of the trapezoidal pulses and of the modulation depth of the AM modulation signal and applies only for a periodic one-to-one telegraph signal, that is to say at maximum transmission speed. In practice, however, the telegraph signal usually consists of arbitrary alternating characters and in that case the frequency components vary in value with time. It has been found that in order to satisfy the CCITT requirements, the adjustment of the slope of the trapezium and of the modulation depth of the AM modulation signal was less critical. For example, for an adjustment of the slope of the trapezium such that the $4^{th}$ order sideband level was attenuated to $-55$ dB and an adjustment of the modulation depth of the AM signal such that the level of the $3^{rd}$ order sideband was suppressed to $-45$ dB, the overall attenuation result for such an FSK signal varies according to curve B in FIG. 1. The amplitude-modulated FSK signal appearing at the output of the amplitude modulator 5 may therefore be applied directly to the carrier modulator, referenced 8 in FIG. 2, without the intermediary of a band-pass filter.

Figure 1:
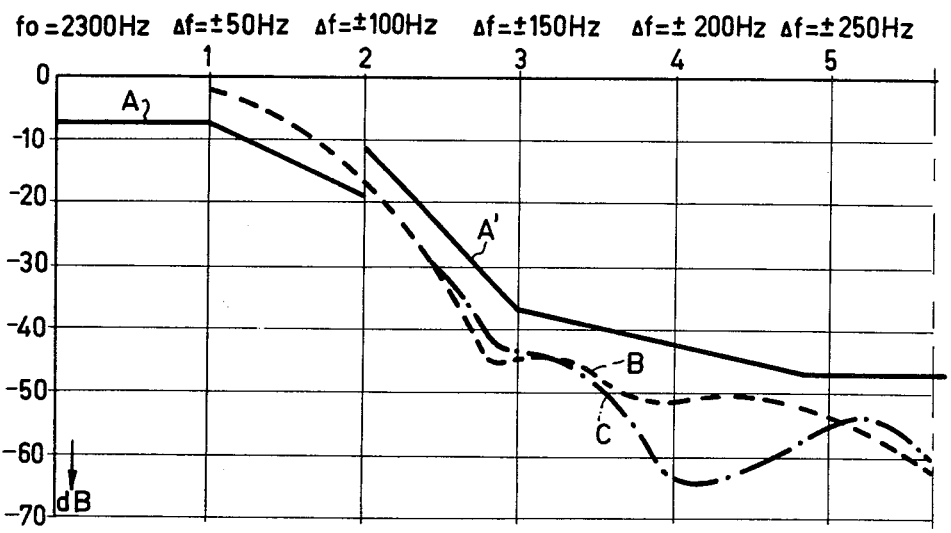
FIG. 1 shows a number of diagrams.

In the embodiment described above, the output signal supplied by the second device 2 is a signal having half the recurrence time of the output signal of the first device. Such a type of signal may also be obtained by quadrature, in which case the said second device 2 may for example be replaced by the device shown in FIG. 6, which is a multiplication device in which the control signal derived from the first device 1 is multiplied by itself. Multiplication devices of the above-mentioned kind are known per se and are described in greater detail inter alia in the above mentioned United States Patent. The signal appearing at the output of the multiplication device 33 is also of the form shown in FIG. 3c and is applied to the amplitude modulator 5 as an amplitude modulation signal. The attenuation variation obtained when using this embodiment is represented in FIG. 1 by the curve C.

Finally it may be noted that similar results have been obtained when other carrier frequencies and other telegraph signal speeds were used.

What is claimed is:

1. An FSK transmitter having a frequency band limitation, said transmitter comprising:
   a. a first device having an input means for receiving an information signal comprising square pulses, and an output means to generate a control signal comprising substantially symmetrical trapezoidal pulses having a recurrence time equal to that of said square pulses;
   b. a second device having an input coupled to said first device output means, and an output means to generate a direct voltage signal the direct voltage value of which shows a positive pulsatory variation each time during the occurrence of the rising and falling edges of the substantially symmetrical trapezoidal pulses of the control signal;
   c. an oscillator modulator including a substantially instantaneously linearly controllable gyrator having a frequency control input to which the control signal supplied by the said first device is applied as a frequency modulation signal, and an output means to generate an FSK output signal; and
   d. an amplitude modulator having a first input to which the FSK output signal of said gyrator is applied and having a second input to which the direct voltage signal of the said second device showing positive pulsatory variations is applied as a modulation signal, and having an output means for providing the band-limited FSK signal.

2. An FSK transmitter as claimed in claim 1, wherein the first device comprises an integrating network and a two-sided limiter coupled to said network.

3. An FSK transmitter as claimed in claim 2, wherein said control signal comprises substantially symmetrical trapezoidal pulses, the ratio of the times of the slope and the flat portion of each of the said trapezoidal pulses being approximately 1/1.

4. An FSK transmitter as claimed in claim 1, wherein said second device comprises a two-sided rectifier, a differential amplifier coupled to the rectifier, and a source of positive direct voltage coupled to said amplifier, whereby said amplifier generates the amplitude modulation signal.

5. An FSK transmitter as claimed in claim 1, wherein said second device comprises a multiplication stage in which the control signal is multiplied by itself.

6. An FSK transmitter as claimed in claim 1, further comprising a carrier modulator to which the amplitude-modulated FSK signal appearing at the output of the amplitude modulator is applied directly as a modulation signal.

* * * * *